United States Patent [19]
Burrell

[11] 3,838,929
[45] Oct. 1, 1974

[54] INTERCHANGEABLE HUB

[76] Inventor: Alfred A. Burrell, 10323 106th St., Edmonton, Alberta, Canada

[22] Filed: Dec. 22, 1972

[21] Appl. No.: 317,616

[52] U.S. Cl............................. 403/365, 74/447
[51] Int. Cl................................... B60b 27/06
[58] Field of Search......... 74/243 DR, 230.3, 230.4, 74/432, 447; 403/359, 362, 365, 366, 375, 356, 345, 288; 285/DIG. 16

[56] References Cited
UNITED STATES PATENTS

| 1,395,913 | 11/1921 | Ford.................................. 74/230.3 |
| 2,612,395 | 9/1952 | Russell............................. 74/230.3 |
| 3,387,864 | 6/1968 | Walters....................... 285/DIG. 16 |
| 3,541,871 | 11/1970 | Burrell................................ 74/447 |

FOREIGN PATENTS OR APPLICATIONS

| 864,110 | 4/1941 | France............................ 74/230.15 |

Primary Examiner—Jordan Franklin
Assistant Examiner—Conrad L. Berman
Attorney, Agent, or Firm—W. Irwin Haskett

[57] ABSTRACT

An interchangeable universal-type hub useable with an assortment of shaft-carried products such as sprockets, pulleys, sheaves, gears, couplings and the like comprising a male sleeve and a female collar, wherein the sleeve has an axial shaft-receiving bore with a longitudinally extending keyway and an exterior toothed surface formed by circumferentially spaced longitudinally extending spline grooves that define wide uniform teeth, each of sufficient width circumferentially to bridge or nestingly accommodate an interior bore keyway in radial registry and wherein the collar has an axial sleeve-receiving opening correspondingly formed with circumferentially spaced longitudinally extending spline teeth to mate with the splined grooves and wide intermediate teeth of the sleeve in non-rotatable, torque-transmitting, press-on relation. The wide teeth of the sleeve preferably do not exceed eight in number. There are carefully selected tolerances between the sleeve and mating components and the sleeve and collar of the device may be bonded in complete assembly by an anaerobic sealant.

2 Claims, 5 Drawing Figures

PATENTED OCT 1 1974 3,838,929

INTERCHANGEABLE HUB

The present invention relates to improvements in an interchangeable hub appertaining particularly to a universaltype hub like device useable with an assortment of shaft mounted products such as sprockets, pulleys, sheaves, gears, couplings and the like, being a further improvement in the inventions dsclosed in my U.S. Pat. Nos. 3,162,057; 3,186,247 and 3,541,871.

In the development of this invention, a prime consideration has been to provide a separable or interchangeable, universal-type hub of relatively minimal exterior diameter having regard to the diameter of its interior, shaft-receiving bore.

In my Pat. Nos. 3,162,057 and 3,186,247, the hub with a shaft-accommodating bore and a longitudinally extending, radial keyway slot therein was provided at one end with a concentric extension of reduced diameter that was exteriorly toothed. A product such as a pulley, sprocket, sheave or the like, for removable mounting on such a hub, had a matching and correspondingly toothed central bore to accommodate the reduced diameter, end extension of the hub. My later Pat. No. 3,541,871 showed an advanced form of interchangeable hub that, in addition to employing a two-part hub comprising complementary sleeve and collar components, allowed of further reduction in the exterior and interior diameter differential by utilization of a form of matching gear teeth on the hub and product respectively wherein one or more of the teeth was of substantial circumferential length, being termed a block tooth, and any such block tooth location coincided with or was in radial registry with the longitudinally extending radial keyway slot in the hub's interior shaft-receiving bore whereby the keyway slot was nested in the spread or circumferential length of the block tooth rather than requiring additional hub thickness to accommodate it.

These interchangeable, universal-type hubs must be produced to extreme accuracy calling for expensive tooling and while the use of multiple, shallow teeth or splines in my earlier hubs provided a favourable medium for distributing the torque requirements of the mounted product, the manufacturing time required to produce them seemed extravagant accordingly multi-start hobs are employed. As multi-thread hobs produce a complete tooth in each multi-tooth segment, the minutest inaccuracy in thread-to-thread spacing of hob threads in combination with potential variable machine settings can result in the proper mating of but a single tooth in each segment and so it was found that a six to nine thread hob could produce proper mating in but four teeth of the total. Furthermore, in larger diameter products involving greater torque, plastical deformation may occur where load rating exceeds the capacity of the few properly mated teeth to the extent that other teeth absorb the additional loading. Though such plastic deformation would assure satisfactory operation of an original product, a serious problem is encountered when attempting to install a new product on a hub with deformed teeth. Since it follows that any variation in tooth form necessitates the use of a multi-thread hob, under the foregoing circumstances, the desirability of a uniform tooth structure in an interchangeable, universal-type hub is apparent.

Accordingly, it is an object of this invention to provide an interchangeable, universal-type hub for press-on, shaft-carried products having a uniform tooth pattern on its exterior circumference wherein the width, i.e., the circumferential length of the tooth is sufficient to accommodate a radially aligned keyway in the shaft-receiving bore of the hub.

A further object of the invention is to provide a hub of the character described having a tooth pattern consisting of only a few, relatively wide, uniform "block" teeth providing full torque capacity for any mounted product.

A further object of the invention is to provide a hub of the character described of integral or two-part form with high torque capacity having invariable proper mating surfaces of the hub parts and for the hub and product consisting of only a few relatively wide "block" teeth separated by spline grooves on the exterior circumference of one and correspondingly spaced splines on the interior circumference of the other.

A further object of the invention is to provide a hub of the character described for use with slide-on interchangeable products providing ample torque capacity through mating gears of improved design with reasonable tolerance between the concentric components and confronting, torque-transmitting gear faces respectively.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

IN THE DRAWINGS

Figure 1:
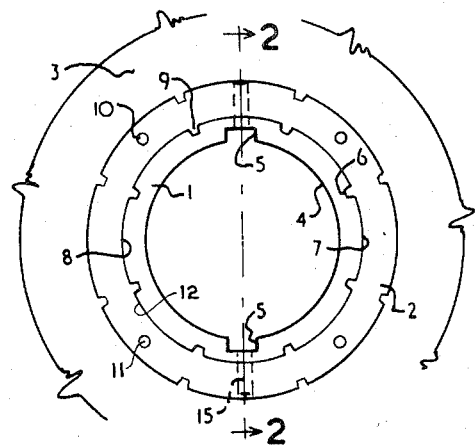
FIG. 1 is a front elevation of a preferred embodiment of a two-part hub incorporating the improved torque-transmitting tooth arrangement.
Figure 2:
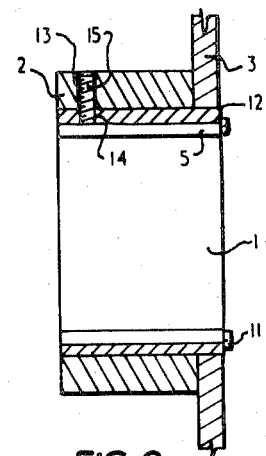
FIG. 2 is a vertical section thereof as taken on line 2—2 of FIG. 1.

Referring now particularly to these drawings, the preferred embodiment shows a two-part hub comprising an interiorly bored sleeve 1 and a collar 2 mounted thereon and a shaft-carried product 3 such as a sprocket, pulley, sheave, gear, coupling or the like disconnectibly mounted on the hub in torque-transmitting relation. The hub sleeve 1 has an axial shaft-receiving bore 4 and a pair of diametrically opposite keyways. 5. The exterior of this hub sleeve has circumferentially spaced longitudinally extending spline grooves 6 defining therebetween wide uniform teeth 7, in the present instance the hub sleeve is shown with eight such teeth each of a width circumferentially to accommodate within its spread, ideally mid-way between adjacent spline grooves, a keyway arranged in radial registry therewith - and two of these teeth in this case do so. By thus fashioning the interchangeable hub with torque-transmitting teeth of a circumferential width to accommodate or bury the keyway or keyways as shown clearly in FIG. 1 great economy in the overall diameter of this item is achieved - which is especially important in small sized products. Particularly significant however is that the uniform wide tooth design with its ample torque capacity can be readily produced by a single thread hob and assure proper mating in initial and also subsequent installations which as already pointed out is not easily achieved or practical with fine teeth.

The collar 2 has an axial, sleeve-receiving opening 8 correspondingly formed with circumferentially spaced, longitudinally extending spline teeth 9 to mate with the spline groove 6 and wide teeth 7 of the sleeve for non-rotatable, torque-transmitting, press-on engagement therewith. Additionally, the collar is shown with four longitudinally extending tapped openings 10, circumferentially spaced at 90° and approximately mid-way of its depth to receive product attaching bolts 11.

Likewise, the product 3, here shown as being relatively thin, has an axial sleeve-receiving opening 12 correspondingly formed as the collar 2 to mate with the sleeve 1 in non-rotatable, torque-transmitting, press-on relation and to tightly engage the collar 2 in juxtaposed position, being provided with four longitudinally extending bores that align with the tapped openings 10 in the collar to pass the said bolts 11.

Normally, collar 2 is of a length equal to the sleeve less the thickness of the intended product 3. The exterior diameter of the collar is preferably less than that of the product, said collar being mounted as mentioned in press-on, sliding fit relation to the sleeve, with its outer end flush with one end of the sleeve. As all sleeves of a given size will accommodate various width collars to complement the thickness of the product it is desirable to provide a threaded radial hole 13 in the collar and an aligned radial body hole 14 in the sleeve of a size corresponding with the thread diameter for the accommodation of a set screw 15, preferably locating the set screw hole 14 in the sleeve so that a set screw centrally positioned in a collar of minimum width may be aligned therewith.

Various taper bushing systems are now in use that afford some inventory reduction but these invariably lead to material increase in product size, i.e., length/width dimensions, and are ineffective in the vast majority of smaller size items. Nevertheless, the present hub may be modified as desired to accept such a taper bushing. Indeed, conversion for all the popular makes and sizes of taper bushings can be accomplished with a modest number of modified, interchangeable, universal type hubs.

Figure 4:
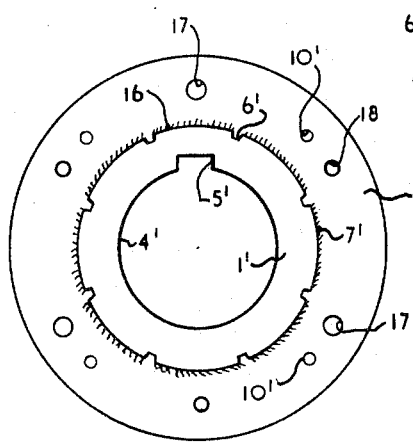
FIG. 4 is a front elevation of a modified form of hub useable with a tapered bushing.
Figure 5:
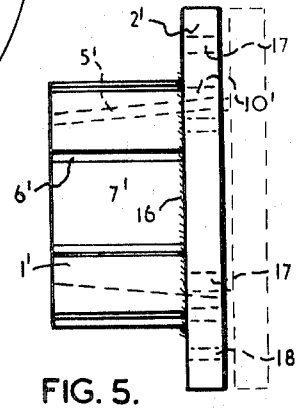
FIG. 5 is a side elevation thereof.

The modified hub shown in FIGS. 4 and 5 is designed for use with a tapered bushing. Here the sleeve 1' is similar to sleeve 1 already described except that it has a tapered bore 4' to correspond with the taper of the bushing to be received therein and has only a single keyway 5', indeed the keyway is necessary only if the bushing has a key that must be accommodated. Also, it will be noted, this sleeve has the same spline grooves 6' defining therebetween wide uniform teeth 7'. The collar 2' also similar to collar 2 already described is here shown as shorter and of slightly larger diameter but differs in this assembly from that previously described by being welded to the sleeve 1' as indicated at 16 and being provided, in addition to the four tapped openings 10' for product-attachment bolts, with (a) three circumferentially spaced body holes 17 and (b) three circumferentially spaced tapped holes 18. The body holes 17 are spaced at 120° as are the tapped holes 18 and are preferably arranged alternately thereby subtending an angle of 60° between adjacent tapped and body holes. They are also shown as lying in a circle of the same radius with the tapped openings 10'. In FIG. 5 a tapered bushing is shown in dotted outline to the right of collar 2'. The purpose of the three body holes 17 is to pass capscrews used to lock the tapered bushing in the hub assembly and when it is desired to release the bushing, such capscrews are first removed from the bushing and then threaded in the tapped holes 18 to force the bushing and hub collar apart.

Figure 3:
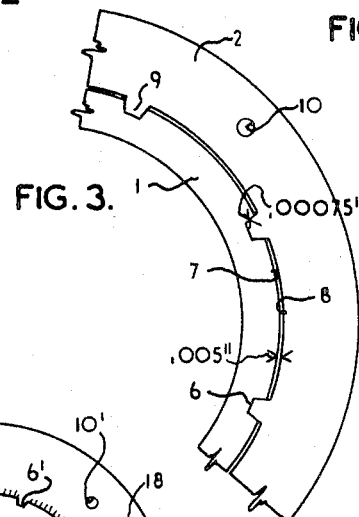
FIG. 3 is an enlarged elevational detail showing meshing of the new torque-transmitting block tooth and spline.

To maximize the advantages of this uniform wide or block tooth design as regards full capacity torque transmission and invariable proper mating of both new and replacement parts, effective tolerance (a) between the sleeve and a mating component such as the collar and/or the product in the order of approximately 0.005 inch and (b) between the torque-transmitting sides of the spline grooves and the mating component's spline teeth in the order of approximately 0.00075 inch have been selected. With such tolerances a further improvement in the device is achieved as an anaerobic sealant such as loctite can be usefully employed in bonding the assembly of complete hubs, the semi-permanent attachment of the collars, etc. when desired. For bonding with this sealant, the most effective tolerance between mating parts is in the mentioned order of approximately 0.005 inch, herein provided between the sleeve and its concentric mating components while the tolerance between the torque transmitting sides of the spline grooves and the mating component's spline teeth is substantially less. Not only are these tolerances critical but their differential is also for, as seen in FIG. 3, the closer tolerance sliding fit of the splines and spline grooves normally causes a concentric mating component to float clear of the sleeve, providing space therebetween for the sealant.

From the foregoing description taken in connection with the accompanying drawings, it will be manifest that an interchangeable hub is provided that will fulfil all the necessary requirements of such a device, but many changes could be made in the above description and many apparently widely different embodiments of the invention may be constructed within the scope of the appended claims.

What is claimed is:

1. An interchangeable, universal-type hub for shaft-carried products comprising a sleeve having a shaft-receiving bore with a longitudinally extending keyway and exterior, circumferentially spaced, longitudinally extending spline grooves defining therebetween wide uniform block, teeth each of sufficient width circumferentially that a tooth in radial registry with said keyway will accommodate the same, and a collar with an axial sleeve-receiving opening correspondingly formed with circumferentially spaced, longitudinally extending spline teeth, mating with the spline grooves and the wide teeth therebetween of the sleeve mounted thereon in non-rotatable, torque-transmitting, press-on relation; the tolerance between said sleeve and said collar being in the order of approximately 0.005 inch; and the tolerance between the torque-transmitting sides of the spline grooves of said sleeve and the mating collar's spline teeth being in the order of approximately 0.00075 inch providing clearance between said concentric mating sleeve and collar for a sealant; the uniform block teeth of said sleeve numbering not more than eight for full torque capacity and capable of being fashioned by a single thread hob to assure invariable mating of both new and replacement components.

2. A device according to claim 1, wherein the tolerance between the sleeve and said mating component being in the order of approximately 0.005 inch; and the tolerance between the torque-transmitting sides of the spline grooves and the mating component's spline teeth being substantially less being in the order of approximately 0.00075 inch; and wherein said clearance between said sleeve and mating component receiving an anaerobic sealant thereby bonding said sleeve and mating component together.

* * * * *